(12) United States Patent
Li et al.

(10) Patent No.: US 8,341,603 B2
(45) Date of Patent: Dec. 25, 2012

(54) TEST CASE MANAGEMENT CONTROLLER WEB ACCESS

(75) Inventors: Heheng Li, Beijing (CN); Hongtao Bai, Beijing (CN); Ivan Ho, Beijing (CN); Xu Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 12/244,775

(22) Filed: Oct. 3, 2008

(65) Prior Publication Data

US 2010/0088677 A1 Apr. 8, 2010

(51) Int. Cl.
*G06F 9/44* (2006.01)

(52) U.S. Cl. ........................................ 717/127

(58) Field of Classification Search .................. None
See application file for complete search history.

(56) References Cited

U.S. PATENT DOCUMENTS

| | | | |
|---|---|---|---|
| 6,044,398 A | 3/2000 | Marullo et al. | |
| 6,662,217 B1 * | 12/2003 | Godfrey et al. | 709/219 |
| 7,231,606 B2 | 6/2007 | Miller et al. | |
| 2004/0194064 A1 | 9/2004 | Ranjan et al. | |
| 2005/0086643 A1 | 4/2005 | Shane | |
| 2006/0101404 A1 * | 5/2006 | Popp et al. | 717/124 |
| 2007/0245315 A1 | 10/2007 | Koike | |
| 2008/0109680 A1 | 5/2008 | Kodaka et al. | |
| 2009/0287791 A1 * | 11/2009 | Mackey | 709/209 |
| 2010/0088677 A1 * | 4/2010 | Li et al. | 717/124 |

OTHER PUBLICATIONS

"Froglogic", 2008, 1 page. http://www.froglogic.com/pg?id=Google&category=squishweb&gclid=CO2XI7HruZMCFRWT1QodSTujBw.
"Web2Test", 2008, 1 page. http://www.web2test.de/lang/en/.

* cited by examiner

*Primary Examiner* — Philip Wang
(74) *Attorney, Agent, or Firm* — Powell IP Law, PLLC; Tracy Powell

(57) ABSTRACT

Described is a technology in which test case content in the form of a web application is provided to a client browser from a test case management system over a web server. Results of running the test case are similarly communicated back. This allows different web application test harnesses to be run on whatever Internet browser the client computing device is running, and is independent of any operating system. The client registers with the test case management system through the website, and receives a browser identifier for use in future communications. In one protocol, the client uses the identifier in heartbeats sent to the test case management system, including a heartbeat indicating when the client is available to run a test case, when the test case is complete, and the results of performing the test case. Also described are various interfaces that facilitate component communication.

19 Claims, 4 Drawing Sheets

TEST CASE MANAGEMENT CONTROLLER WEB ACCESS

BACKGROUND

A software system called TCM (Test Case Management) automatically executes test cases and manages test machines. In current implementations, TCM can manipulate test machines only if a TCM client is installed and run as a client application on each test machine.

Web applications also may be tested. However, customers using a web browser other than Internet Explorer running on a Windows® operating system are not supported. Existing TCM systems fail to support this case because no client applications are available, and/or because of difficulties in developing client application for non-Windows® operating systems. As a result test cases for non-Windows® operating systems have to be executed or launched manually, which increases the cost of software development.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which test case content in the form of a web application and its post-execution results are communicated between a client and a test case management system over a web server. This allows different web application test harnesses to be run on whatever Internet browser the client computing device is running. As one result, the test case management system and client computing device that runs the browser are independent of any particular operating system.

In one aspect, the client registers with the test case management system through a website. The test case management system returns an identifier for the browser for use in future communications between the browser and the test case management system. The client uses the identifier in heartbeats sent to the test case management system, including a heartbeat indicating when the client is available to run a test case.

In one aspect, when the client is available and the test case management system decides when to provide the client with a test case, a test case configured as a web application is provided to the client. The client runs the test case, and when complete, returns results to the test case management system, e.g., in a later heartbeat. In this manner, any client running any contemporary web browser and/or operating system may be supported by the test case management system.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards delivering test case content and execution results over a web server, e.g., instead of via a test case management client application. While some of the examples described herein are directed towards protocols and interfaces to facilitate the delivery, along with interfaces to accommodate different test case management systems for test case management controller web access and interface to accommodate different web application test harnesses running on internet browsers, it is understood that these are only examples. Indeed, numerous other protocols and/or interfaces may be used to provide a similar benefit.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and test case management in general.

Figure 1:
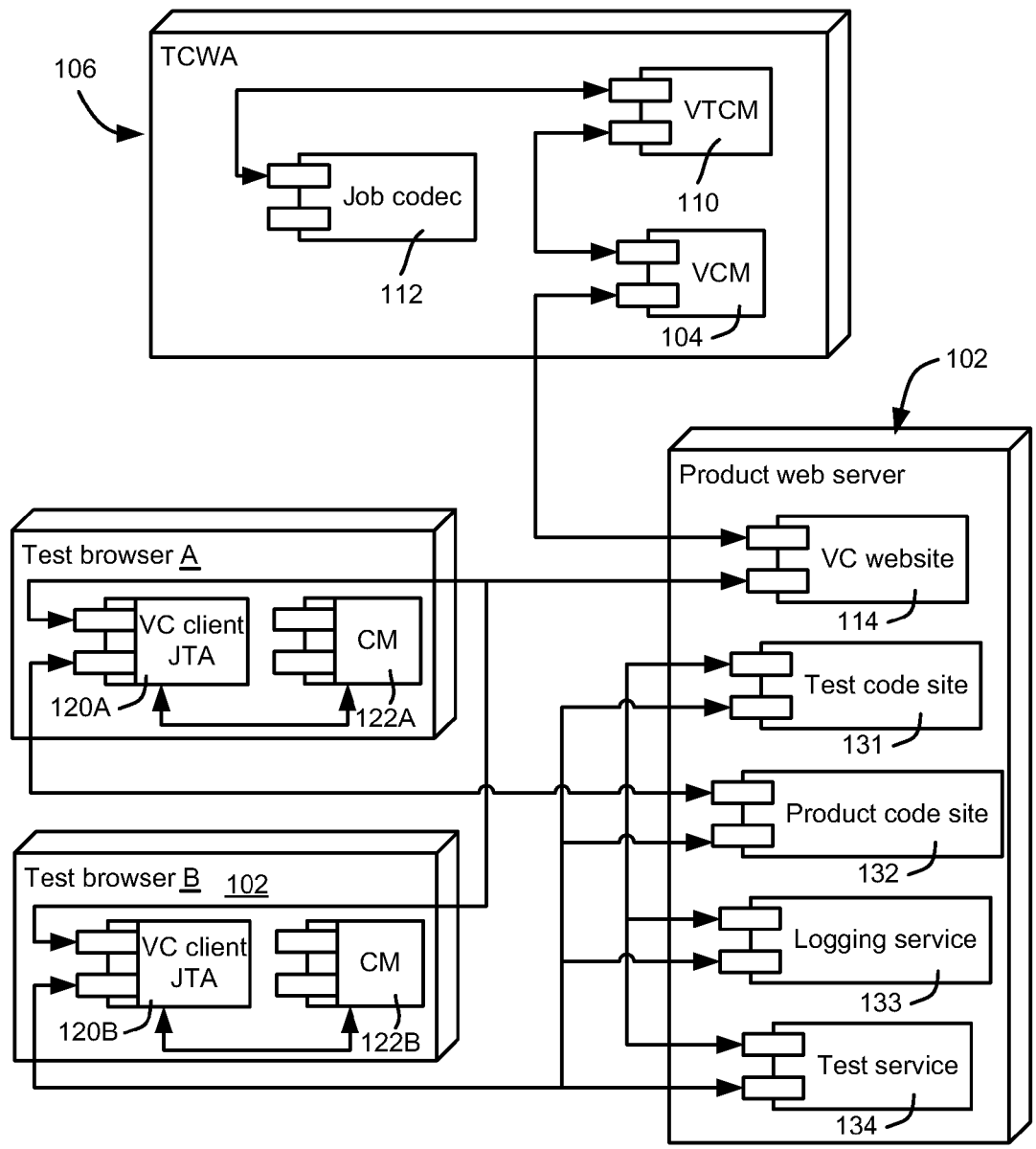
FIG. 1 is a block diagram showing an example test case management controller web access system.

Turning to FIG. 1, there is shown an example TCM controller web access implementation in which computing devices corresponding to test browser A and test browser B are being remotely managed via a web server 102. Note that while test browser A and test browser B may be running on separate machines, it is understood that they may possibly share one test machine.

A virtual client manager (VCM) 104 acts as a bridge between a test controller web access (TCWA) subsystem 106 and the web server 102, generally for handling test cases, execution results and task distribution. A job session service may be used to separate test case and web browser registration, e.g., to enable test case execution that may use multiple browsers and/or other execution units.

Note that as also shown in FIG. 1, a virtual TCM (VTCM) 110 is an abstract of TCM with which the test controller web access (TCWA) subsystem communicates. The job Codec 112 provides a translation mechanism between a TCM system-specific job/result description and a test case running inside the virtual client manager 102.

A virtual client 114 comprises a stateless website, which acts as HTTP channel with AJAX (asynchronous JavaScript and XML), and a web application running on a web browser, which manages the state of a web browser as an execution unit. Other components 131-134 of the product web server are shown for completeness.

Each test browser includes a JavaScript Test Arena (JTA) 120A or 120B): interface to test case running on the web browser. In each tested browser, a client Monitor (CM, 122A or 122B) comprises an application program running along with the web browser. One task of the client monitor is to restart the web browser for each test case, such as to compensate for any resource leaks and/or exception halts.

Figure 2:
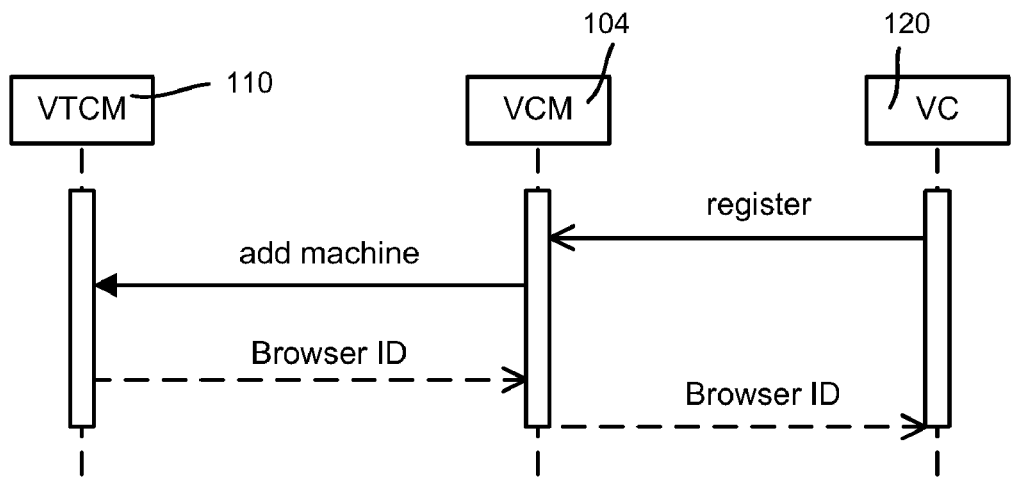
FIGS. 2-4 are representations of communications and control flow between various components of the test case management controller web access system.

Turning to various communication scenarios, FIG. 2 represents a virtual client 120 registering with a test case management system. To this end, the virtual client manager 104 provides necessary information to the test case management system (e.g., adds the machine and gets back a browser identifier via the virtual test case manage 110), adds the browser identifier as a new execution unit and returns it to the client 120.

Figure 3:
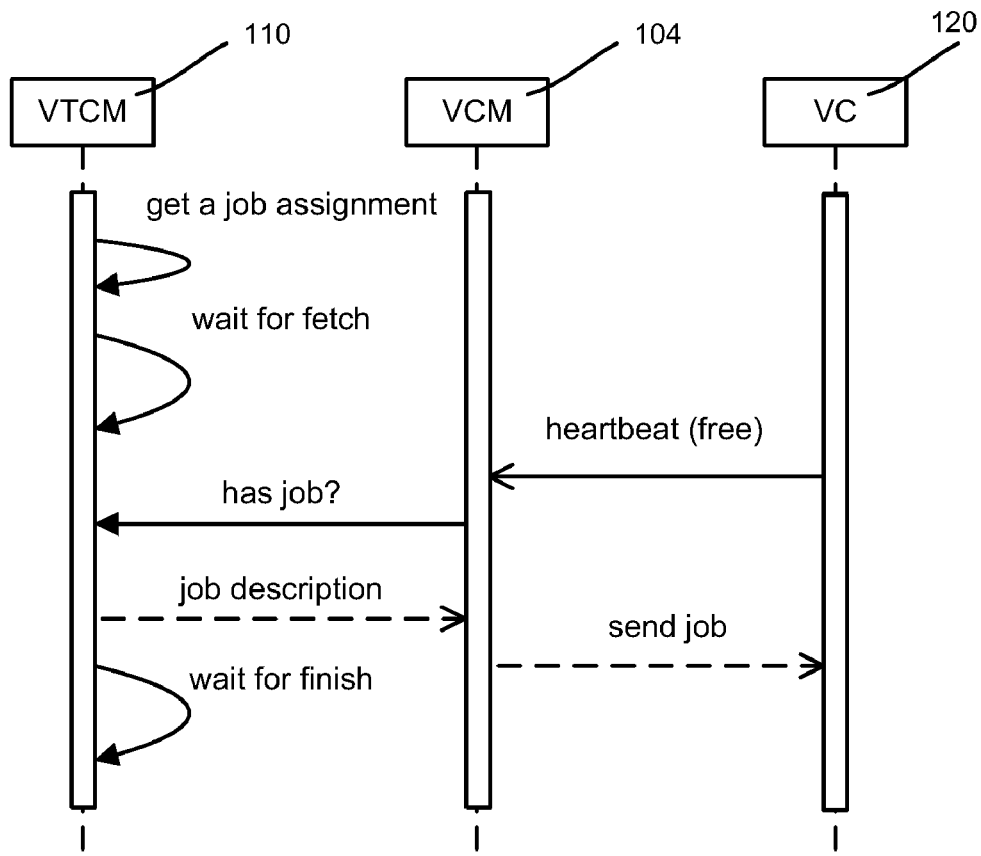

FIG. 3 exemplifies a heartbeat sent from the virtual client 120 to the test case management system. More particularly, the virtual client 120 periodically sends a heartbeat request to announce its aliveness/availability, and to poll for whether there is a test case assigned to it. Note that the browser identifier received during the registration process of FIG. 2 is carried to the test case management system in the heartbeat request so that the system knows which client is reporting. Moreover, because the identifier is associated with the browser, multiple browsers running on the same machine may be differentiated via each one's identifier.

If a job is assigned, it is returned by the system 110 (via the manager 104) to the virtual client 120; the system waits for the job to finish with respect to that client. More particularly, when the test case management system decides to assign a test case as a job to one or more web browsers, it waits for the virtual client 120 to fetch the job; that is, the virtual client 120 will pass over a web browser's request. Given the fact that there may be many browsers being assigned a job at the same time, each job is buffered in the test case management system until it is fetched to the virtual client 120.

Figure 4:
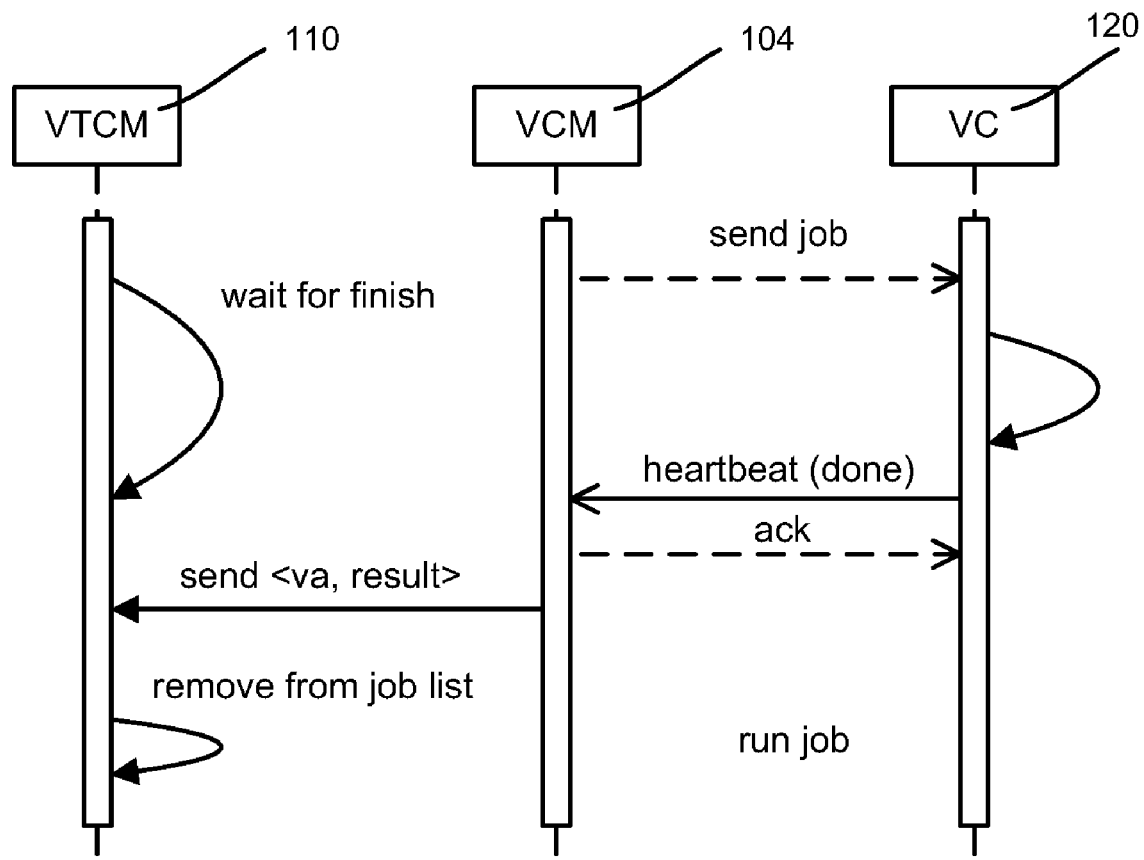

FIG. 4 exemplifies result reporting from the virtual client 120 to the test case management system. As shown in FIG. 4, when the test case as a job is finished in the virtual client 120, the virtual client 120 sends a heartbeat with an attached execution result. The test case management system stops waiting (by the signal passed over from the virtual client 120) and reports the results.

In this manner, a web browser may be launched to navigate to a URL, whereby a test case from an existing text case management system is delivered to the browser, and executed, with the execution result sent back to the test case management system independent of the client application. This framework thus enables this process to work on any operating system. Note that the tested machine only needs a very simple client manager application (122A or 122b in FIG. 1) to handle exception and cleanup issues.

Example Interfaces

Interface IWebTCM—Implemented by VTCM as the Interface Between a VTCM and a VCM:

| Method | Parameter/Result | | Description |
| --- | --- | --- | --- |
| Response Register( string assetName, string assetInfo) | assetName | VA name to help build unique ID | VCM wants to register a VA to VTCM |
| | browserInfo | VA information | |
| | Return value | Asset ID returned if succeeds | |
| Response Unregister( string assetID) | assetID | Specifying VA to unregister | VCM wants to unregister a VA from VTCM |
| | Return value | Asset ID returned if succeeds | |
| Response Poll( string assetID, TcwaAssetStatus assetStatus) | assetID | Specifying VA to query | VCM wants to query whether a job is assigned to specific VA |
| | assetStatus | Specifying current VA status | |
| | Return value | Job description text if any, otherwise empty string is returned | |
| Response SendResult( string assetID, string result) | assetID | Specifying VA to send result | VCM wants to send back the job result for specific VA |
| | result | Job result | |
| | Return value | ACK specifies feedback | |

Interface IJobCodec—Implemented by Job Codec:

| Method | Parameter/Result | | Description |
| --- | --- | --- | --- |
| string EncodeJob( string job) | job | Job description from VTCM | When IWebTCM.Poll is about to return the job description he should call this method to encode so that test harness gets a TCM-independent format |
| | Return value | Encoded job description for test harness | |
| string DecodeResult( string result) | result | Result expression from test harness | Before IWebTCM.SendResult really sends the result he should call this method to decode so that TCM gets a test harness independent format |
| | Return value | Decoded result expression for VTCM | |
| UInt32 JobTimeout( string job) | job | Job description from VTCM | Job timeout is required for plug-in and JTA to maintain reliability |
| | Return value | Timeout value in milliseconds, zero if not found | |
| bool SendResult( object TCMReporter, string job, string result) | TCMReporter | Result sender | Send result in VTCM way |
| | job | Job description from VTCM | |
| | result | Result to send for VTCM | |
| | Return value | Succeeds or not | |

-continued

| Method | Parameter/Result | | Description |
|---|---|---|---|
| bool SendTimeout( object TCMReporter, string job) | TCMReporter job | Result sender Job description from VTCM | Send timeout result in VTCM way |
| | Return value | Succeeds or not | |

Interface ITcwaService—Implemented by VCM as the Interface Between a VC and a VCM:

| Method | Parameter/Result | | Description |
|---|---|---|---|
| Response RegisterBrowserInstance( string browserName, string browserInfo) | browserName browserInfo Return value | Browser name to help build unique ID Browser information Browser ID returned if succeeds | VC wants to register a browser to VCM |
| Response UnregisterBrowserInstance( string browserID) | browserID Return value | Specifying browser to unregister Browser ID returned if succeeds | VC wants to unregister a browser from VCM |
| Response Heartbeat( string browserID, string browserStatus, string browserData) | browserID browserStatus browserData Return value | Specifying browser to query Specifying current browser status Data to sent by VC Job description text if any, otherwise empty string is returned | VC wants to query whether a job is assigned to specific browser |

Interface JTAConfig is implemented by JTA. A JTAConfig.js file is used to provide information to VC:
JTAConfig.EntryPage—specify entry HTM file that hosts for test code.
JTAConfig.ReloadEntryPageBeforeEachTest—specify whether reloading entry page above, used in JSS scenario.
JTACOnfig.ResetDevPageBeforeEachTest—specify whether reset product code page to about:blank, used in JSS scenario.
JTAConfig.fn_IsLoaded—specify function to detect whether entry page above is loaded.
JTAConfig.fn_Initialize—specify function to initialize for given task, with task description and reference to the frame hosting product code.
JTAConfig.fn_Execute—specify function to start executing the task.
JTAConfig.fn_IsFinished—specify function to detect whether task is done, with null for not done and not null for task result.
JTAConfig.fn_IsLastTest—specify function to check whether this is the end of the whole test case, used in JSS scenario.

Exemplary Operating Environment

Figure 5:
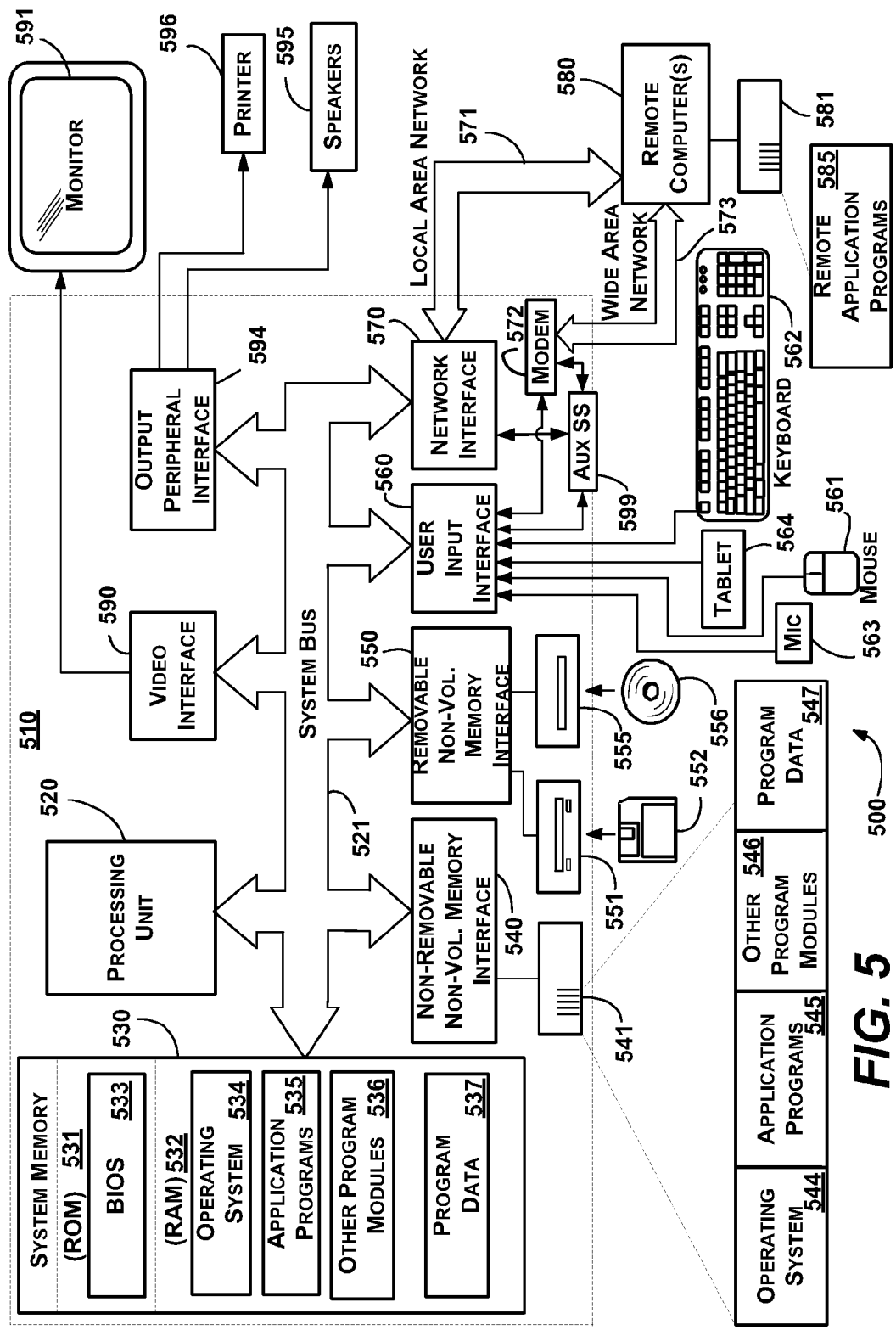
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   operating a browser on a client computing machine;
   accessing a website via the browser for communicating with a test case management system;
   sending a heartbeat from the client computing machine to the test case management system, the heartbeat indicating that the client computing machine is available to perform a test case;
   receiving a web application corresponding to a test case provided from the test case management system in response to the heartbeat; and
   running the web application on the client computing machine to perform the test case.

2. The method of claim 1 further comprising, reporting results of performing the test case to the test case management system via the website.

3. The method of claim 1 further comprising, registering the browser of the client computing machine with the test case management system via communication through the website.

4. The method of claim 3 further comprising, in response to registering, receiving an identifier from the test case management system that identifies the browser for use in further communications with the test case management system.

5. The method of claim 4, wherein the heartbeat includes the identifier.

6. The method of claim 5 wherein another heartbeat indicates that the client computing machine has completed performing the test case.

7. The method of claim 6 wherein the another heartbeat further reports results of performing the test case to the test case management system.

8. In a computing environment, a system comprising:
   a test case management system that provides test cases configured as web applications to clients via a web server, including:
      means for detecting availability of a client to run a test case using a heartbeat, wherein the heartbeat indicates availability of the client to run the test case;
      means for providing the test case to the client in response to the heartbeat; and
      means for receiving a result of the client's running of the test case from the client.

9. The system of claim 8 further comprising, means for registering the client, and an identification mechanism by which the test case management system differentiates the client from other clients.

10. The system of claim 9 wherein the identification mechanism is associated with an instance of a browser such that a client may run a plurality of test cases, each test case run on a different browser instance.

11. The system of claim 8 wherein the means for detecting the availability of the client to run the test case comprises a client heartbeat-based communication protocol.

12. The system of claim 8 wherein the means for receiving the result comprises a client heartbeat-based communication protocol.

13. The system of claim 8 wherein the client and the test case management system are running on different operating systems relative to one another.

14. The system of claim 8 further comprising a set of defined interfaces by which clients communicate with the test case management system independent of any particular browser being operated on the clients.

15. One or more computer storage media storing computer-executable instructions, which when executed perform steps, comprising:
   registering a client machine with a test case management system via a browser executing on the client machine and in communication with the test case management system through a web server;
   sending a heartbeat from the client machine to the test case management system, the heartbeat indicating the client machine is available;
   receiving a test case from the test case management system in response to the heartbeat;
   running the test case on the client computing machine via the browser to perform the test case; and
   reporting results of performing the test case to the test case management system via browser communication through the web server.

16. The one or more computer storage media of claim 15 storing further computer-executable instructions, comprising, using an identifier that was received from the test case management system in response to registering in future communications with the test case management system.

17. The one or more computer storage media of claim 16 storing further computer-executable instructions, comprising, communicating with the test case management system by sending heartbeats that include the identifier.

18. The one or more computer storage media of claim 16 wherein reporting the results comprises including the results is association with one of the heartbeats.

19. The one or more computer-storage media of claim 16 wherein the identifier is associated with an instance of the browser.

* * * * *